United States Patent
Morris et al.

[11] Patent Number: 5,538,349
[45] Date of Patent: Jul. 23, 1996

[54] BAYONET BEARING RETAINER

[75] Inventors: Philip A. Morris, Worsley; Michael J. Cottam, Hesketh Bank, both of England

[73] Assignee: Eaton Corporation, Cleveland, Ohio

[21] Appl. No.: 403,156

[22] Filed: Mar. 13, 1995

[51] Int. Cl.$^6$ ............................................. F16C 43/04
[52] U.S. Cl. ..................... 384/585; 29/898.07; 384/295; 384/537
[58] Field of Search .................... 384/295, 296, 384/428, 435, 436, 439, 537, 559, 584, 585, 906; 29/898, 898.07

[56] References Cited

U.S. PATENT DOCUMENTS

| | | | |
|---|---|---|---|
| 3,874,752 | 4/1975 | Imazaike | 384/296 |
| 4,070,623 | 1/1978 | Dingley | 384/295 X |
| 4,685,172 | 8/1987 | O'Connor | 384/537 X |
| 5,080,501 | 1/1992 | Siebert et al. | 384/439 X |
| 5,232,341 | 8/1993 | Shier et al. | 384/537 X |

*Primary Examiner*—Thomas R. Hannon
*Attorney, Agent, or Firm*—L. J. Kasper; H. D. Gordon

[57] ABSTRACT

A bearing retention arrangement is disclosed for rotatably supporting a shaft (27) within a bearing opening (75) defined by a wall portion (35). The bearing retainer (83) is cylindrical and includes a pair of bayonets (89,91), and the bearing opening (75) defines recesses (77,79) Which conform generally to the bayonets. After the shaft (27) is in place, along with the bearing inner race (63) and bearing members (65), the outer race (67) is pressed into the retainer (83). The retainer is then passed through the bearing opening, with the bayonets passing through the recesses, until the bayonets (89,91) are disposed adjacent a forward surface (71) of the wall portion (35). The bearing retainer is then rotated until the bayonets are no longer rotationally aligned with the recesses, and finally, some form of antirotation device (95,99) is installed to prevent rotation of the bearing retainer from its assembled position (FIG. 3).

12 Claims, 4 Drawing Sheets

BAYONET BEARING RETAINER

BACKGROUND OF THE DISCLOSURE

The present invention relates to devices in which a shaft is rotatably mounted within a housing, by means of a set of bearings, and more particularly, to an improved bearing retention arrangement for use in such devices.

Although the present invention may be utilized with a number of different types of devices, it is especially advantageous when utilized in conjunction with a compound, change gear mechanical transmission, and will be described in connection therewith. The present invention is even more advantageous when utilized in such a transmission of the type including at least a pair of countershaft assemblies, and the invention will be described in connection therewith.

Typical compound change gear transmissions are illustrated and described in U.S. Pat. Nos. 4,290,515 and 4,736,643, both of which are assigned to the assignee of the present invention and incorporated herein by reference. Such transmissions include a main transmission section and an auxiliary transmission section, with the two sections being separated by a transverse wall portion, normally formed integrally with the transmission housing. The main transmission section includes a pair of countershafts, each of which is rotatably supported, within suitable bearings, by a forward wall of the transmission, and by the intermediate, transverse wall separating the transmission sections.

In many devices of the type described herein, the housing of the device is cast aluminum, or some aluminum alloy, while the outer race of the bearing set, which is disposed within an opening in the aluminum housing, is made from steel. The coefficient of thermal expansion of the aluminum differs substantially from that of the typical steel bearing race, and as a result, it has been known for the outer race of the bearing set to become loose within the housing bore at elevated temperatures, and merely rotate with the shaft and bearings.

In order to eliminate the possibility of the bearing set becoming loose within the housing bore, those skilled in the art have utilized bearing retainers, which are typically cylindrical, sleeve-like members which typically have a coefficient of thermal expansion closer to that of the bearing outer race. The bearing retainer receives the bearing outer race, and is received within the housing bore. One common arrangement has been to provide the bearing retainer with a radially-extending flange, which is then bolted to the aluminum housing, or attached thereto by some other suitable means, to ensure that there will be no rotation of either the bearing outer race or the retainer, relative to the housing bore.

The flange on the bearing retainer may also be useful in taking up some of the axial loading applied to the shaft being supported, such axial loading otherwise tending to move the bearing outer race axially relative to the housing bore. Unfortunately, there are a number of devices in which a shaft is rotatably mounted within a housing, by means of a bearing set, wherein the conventional, prior art bearing retainer sleeve either cannot be utilized, or if utilized, can only be installed in a manner which fails to take maximum advantage of the inherent benefits of the bearing retainer.

SUMMARY OF THE INVENTION

Accordingly, it is an object of the present invention to provide an improved bearing retention arrangement which does not, by its configuration, limit its applicability.

It is another object of the present invention to provide such an improved bearing retention arrangement which simplifies, and therefore makes less expensive, the assembly of the bearing retainer as well as the means for preventing rotation of the retainer.

The above and other objects of the invention are accomplished by the provision of an improved bearing retention arrangement for use in rotatably mounting a shaft relative to a housing defining a bearing opening. The shaft includes a mounted portion adapted to be received within the bearing opening. A bearing set is disposed radially between the mounted portion of the shaft and the bearing opening, and a generally cylindrical sleeve member is disposed radially between the bearing set and the bearing opening.

The improved bearing retention arrangement is characterized by a leading end of the sleeve member includes at least one retaining portion extending radially beyond a cylindrical outer surface of the sleeve member, whereby the leading end of the sleeve member defines an overall profile which is non-circular. The bearing opening of the housing is configured, over substantially the entire axial length thereof, to correspond approximately to the overall profile of the leading end of the sleeve member, to permit insertion of the member, while in a first rotational orientation, into the bearing opening. During insertion the leading end of the sleeve member moves axially in a first direction through the bearing opening to an axial position in which the retaining portion is disposed axially forward of the bearing opening. After rotation of the sleeve member about an axis of rotation of the shaft, to a second rotational orientation, the retaining portion is disposed in engagement with a forward surface of the housing to prevent substantial axial movement of the sleeve member in a second direction, opposite the first direction. The bearing retention arrangement includes means operable to maintain the retaining portion of the sleeve member in the second rotational orientation, in response to radial and axial loads being applied to the shaft.

DESCRIPTION OF THE PREFERRED EMBODIMENT

Figure 1:
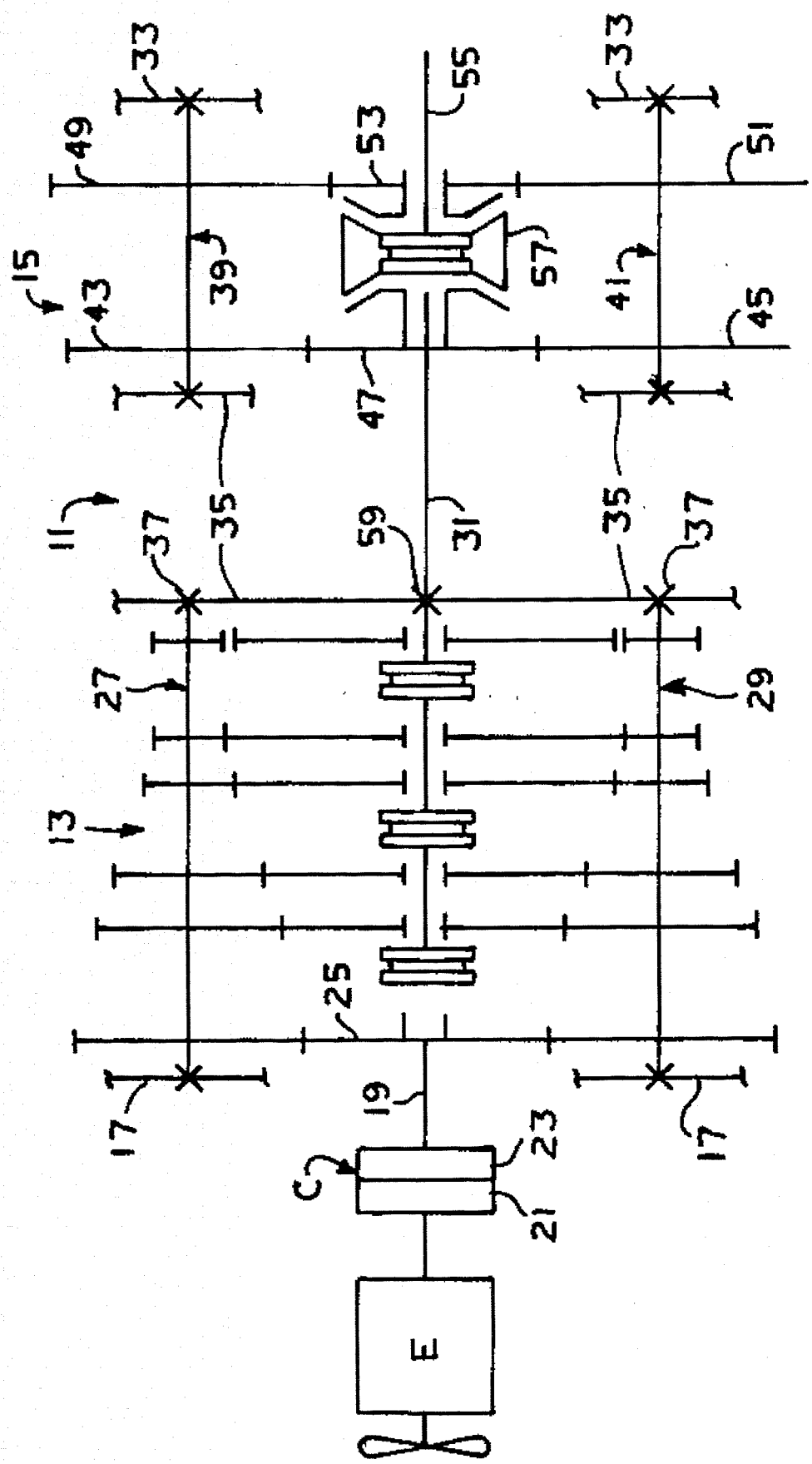
FIG. 1 is a schematic illustration of a compound change gear mechanical transmission of the type with which the present invention may be utilized.

Certain terminology will be used in the following description for convenience only and will not be limiting. The words such as "right", and "left" will designate directions in the drawings to which reference is made. Words such as "forward" and "rearward" will refer respectively to the front and rear ends of the transmission as conventionally mounted in a vehicle, being from left and right sides, respectively, of the transmission as illustrated in the drawing figures. The words "inwardly" and "outwardly" will refer to directions toward and away from, respectively, the geometric center of the device, or an axis of rotation of the element to which reference is being made. Such terminology includes the words specifically mentioned above, as well as derivatives thereof and words of similar meaning.

The term "compound transmission" is used to designate a change speed or change gear transmission having a main transmission section and an auxiliary transmission section, connected in series, whereby the selected gear reduction in the main transmission section may be compounded by further selected gear reduction in the auxiliary transmission section. Although the use of the present invention is not strictly limited to a compound transmission, the invention is especially advantageous when used with a compound transmission, and will be described in connection therewith. Several typical compound transmission configurations are illustrated and described both schematically and structurally in U.S. Pat. No. 4,788,889, assigned to the assignee of the present invention and incorporated herein by reference.

Referring now primarily to FIG. 1, which is not intended to limit the invention, there is illustrated schematically a range type compound change gear mechanical transmission, generally designated 11. The transmission 11 is a ten forward speed transmission comprising a front, main transmission section 13, and a rear, auxiliary transmission section 15. Although, in the subject embodiment, the main transmission section 13 comprises the "front" section, and the auxiliary transmission section 15 comprises the "rear" section 15, the invention is not so limited.

Typically, the transmission 11 is disposed within a housing 17, and includes an input shaft 19, driven by a prime mover, such as a vehicle engine E through a selectively disengaged, normally engaged friction-type master clutch C. As is well known to those skilled in the art, the clutch C has an input or driving portion 21, drivingly connected to the engine crank shaft, and an output or driven portion 23, rotatably fixed to the transmission input shaft 19. It should be noted that the portion of the housing 17 adjacent the input shaft 19 is subsequently referred to as a "forward" or "first" wall portion, and designated by the reference numeral "17".

In the main transmission section 13, the input shaft 19 carries an input gear 25 for simultaneously driving a pair of substantially identical countershaft assemblies, generally designated 27 and 29. The reference numerals 27 and 29 will also be used hereinafter to refer specifically to the countershafts themselves. The countershafts 27 and 29 are provided on diametrically opposite sides of a main shaft 31, which is generally coaxially aligned with the input shaft 19.

Figure 2:
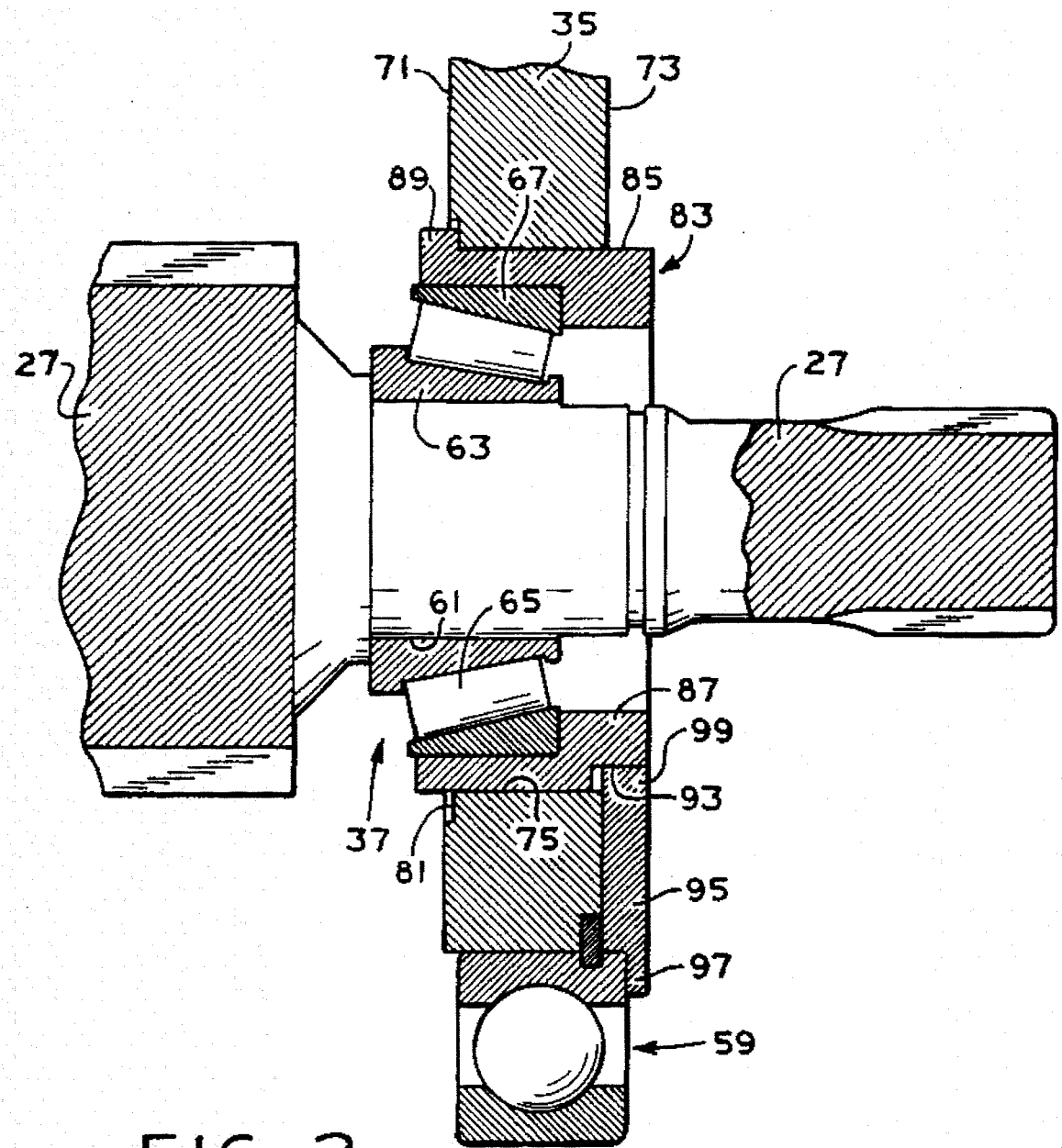
FIG. 2 is an enlarged, fragmentary axial cross-section, taken on line 2—2 of FIG. 3, illustrating the bearing retention arrangement of the present invention.

The housing 17 typically includes a rear wall portion, schematically designated 33 in FIG. 1. Disposed intermediate, axially, the front wall of the housing 17 and the rear wall portion 33 is an intermediate wall portion 35, which is shown schematically in FIG. 1 as comprising two separate wall portions but which, as is well known to those skilled in the art, structurally comprises a single wall portion, and is shown fragmentarily in FIGS. 2 and 3. The countershafts 27 and 29 are rotatably supported, relative to the housing 17 and intermediate wall portion 35 by suitable bearings, only the bearings in the wall portion 35 being shown herein, such bearings being designated by the reference numeral 37. By way of reference, the bearings 37, supporting the countershaft 27, are shown in FIG. 2.

The various countershaft gears disposed on the countershafts 27 and 29, and the various main shaft gears disposed on the main shaft 31 will not be referenced or described herein, in view of the above incorporation of the several U.S. patents. Similarly, the various sliding clutch collars, used for selective clutching of the main shaft gears, will not be referenced or described herein. Finally, the various control mechanisms, including shift forks and the shift bar housing assembly used to control the sliding clutch collars will also not be referenced or described herein.

Referring still to FIG. 1, the auxiliary transmission section 15 includes a pair of substantially identical, auxiliary countershaft assemblies 39 and 41, and the reference numerals 39 and 41 will also be used hereinafter to refer to the countershafts themselves. The countershafts 39 and 41, which are shown only in FIG. 1, are rotatably supported relative to the intermediate wall portion 35 and rear wall portion 33 by suitable bearing sets. The countershafts 39 and 41 carry auxiliary section countershaft gears 43 and 45, respectively, fixed for rotation therewith. The gears 43 and 45 are constantly meshed with, and support, auxiliary section range gear 47 which rotates with the main shaft 31. Auxiliary countershaft gears 49 and 51 are also fixed to, and rotate with, the countershafts 39 and 41, respectively, and are constantly meshed with, and support range/output gear 53. Although the present invention will be illustrated and described in connection with rotatably supporting the countershafts 27 and 29, those skilled in the art will recognize that the invention could also be applied advantageously to the countershafts 39 and 41.

A synchronized sliding jaw clutch collar 57 is fixed for rotation to the output shaft 55 and is utilized selectively to couple either the range gear 47 or the output gear 53 to the output shaft 55. The output gear 53 is connected to the output shaft 55 only when the synchronizer 57 is shifted rearward. The structure and function of the auxiliary transmission section 15 is also now well known to those skilled in the art, and will not be described in any further detail, again partly in view of the above incorporation of the several U.S. patents.

Referring now primarily to FIG. 2, the bearing retention arrangement of the present invention is illustrated therein. Disposed radially between the main shaft 31 and a centrally-disposed opening in the intermediate wall portion 35 is a ball bearing set 59, shown in FIG. 2 primarily as a point of reference, but also shown schematically in FIG. 1. The countershaft 27 includes a shoulder 61, which comprises the "mounted portion" of the countershaft 27, and on which is disposed an inner race 63 (cone) of the bearing set 37. Seated against the inner race 63 is a plurality of tapered roller bearing members 65, and surrounding the members 65 is an outer race 67 (cup).

The intermediate wall portion 35 defines a forward surface 71 and a rearward surface 73. The wall portion 35 further defines a retainer opening 75, through which the countershaft 27 extends. In the subject embodiment, the retainer opening 75 must be just large enough to permit insertion of the countershaft 27 through the opening 75 (moving from the rear toward the front, or right to left in FIG. 2).

Figure 4:
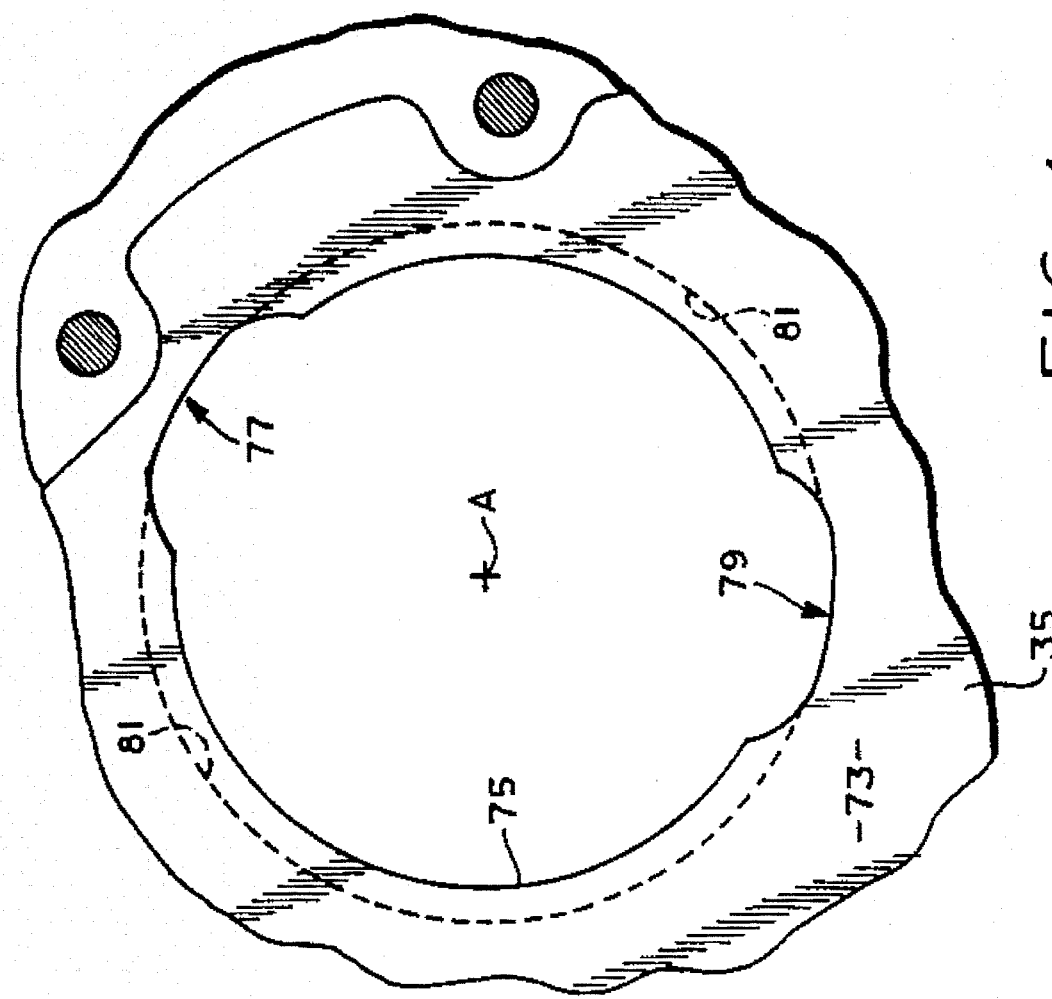
FIG. 4 is a transverse plan view, similar to FIG. 3, illustrating the opening in the intermediate wall portion.

As may best be seen in FIG. 4, the retainer opening 75 includes a pair of axially extending recesses 77 and 79. Finally, the forward surface 71 of the wall portion 35 defines a shallow, annular recess 81, the function of which will be described subsequently.

Figure 5:
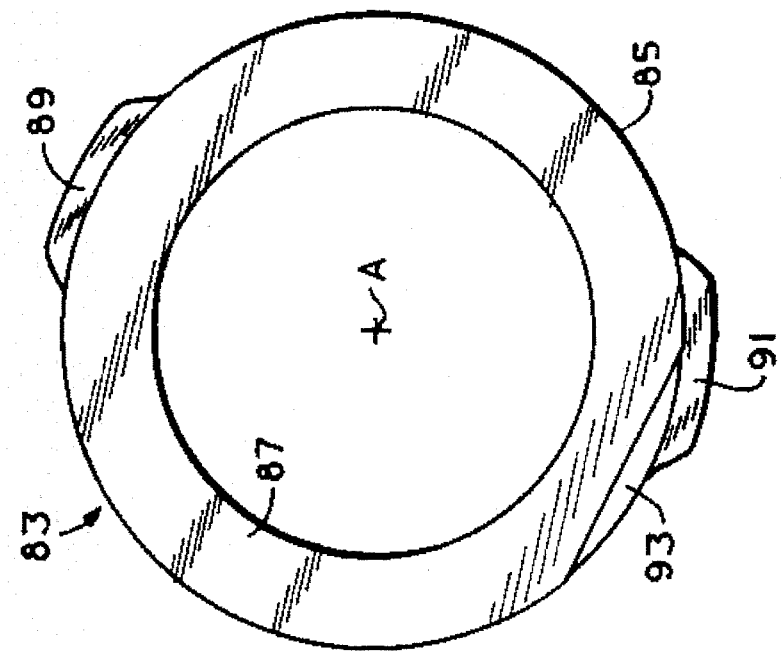
FIG. 5 is a view, similar to FIG. 3, and on the same scale, illustrating only the bearing retainer of the present invention.

Referring now primarily to FIG. 5, in conjunction with FIG. 2, there is illustrated a bearing retainer, generally designated 83 which defines a generally cylindrical peripheral outer surface 85, the surface 85 being received within the retainer opening 75, and closely spaced apart therein. At the rearward end of the retainer 83 is an annular, radially inwardly extending portion 87, the function of which is to serve as a stop for the outer race 67, i.e., preventing movement thereof in the rearward direction.

Preferably, the bearing retainer 83 may comprise a unitary cast iron member, or it may comprise a steel member, although it should be understood by those skilled in the art that the present invention is not limited to any particular material for the retainer 83. If the bearing retainer 83 is a cast iron member, it preferably may be used in the as-cast condition, not requiring any expensive and time consuming machining. In the subject embodiment, it is not believed that any particular heat treatment or surface treatment is required for the retainer 83, and the various dimensions and dimensional relationships involved are merely such as would be well known to those skilled in the art of bearings and bearing retainers.

Formed integrally with the bearing retainer 83 is a pair of radially extending bayonets 89 and 91 which, as may be seen in FIGS. 2 and 5, are fairly short, in both the axial and radial directions, compared to the overall dimensions of the retainer 83. Those skilled in the art will understand that the particular number of bayonets is not essential to the present invention, although it would clearly be preferable to have at least two bayonets, and probably no more than about four, for reasons relating to the assembly process.

Referring now to FIGS. 4 and 5, it may be seen that the bayonets 89 and 91 are in the same orientation, relative to an axis of rotation A, as are the axially extending recesses 77 and 79, respectively. Furthermore, the recesses 77 and 79 conform generally to the shape of the bayonets 89 and 91, respectively, but are somewhat larger than the bayonets, for reasons which will be described subsequently. It is an essential feature of the present invention that the bayonets 89 and 91 provide the front end of the bearing retainer 83 with an overall profile which is non-circular. Furthermore, references hereinafter to the bearing opening 75 (including the recesses 77 and 79) conforming or corresponding to the overall profile of the forward (leading) end of the retainer 83 will be understood merely to require that the retainer 83 be insertable within the opening 75 (to the position shown in FIG. 2), and thereafter be prevented from rearward axial movement relative to the wall portion 35. Referring still to FIGS. 2 and 5, the bearing retainer 83 also defines a flat 93, the function of which will also be described subsequently.

Referring again primarily to FIGS. 4 and 5, it may be seen that the recesses 77 and 79, as well as the bayonets 89 and 91 are not exactly diametrically opposite the axis of rotation A. The particular relationship of the recesses and the bayonets to the axis of rotation A is not an essential feature of the invention. Those skilled in the art will appreciate that being nearly diametrically opposed will provide a better distribution of axial loads transmitted through the bearings 37 to the wall portion 35 by means of the bearing retainer 83, as will be described in greater detail subsequently.

In order to assemble the bearing retainer 83 within the opening 75 of the wall portion 35, the retainer 83 should be placed in the orientation shown in FIG. 5, but coaxial with the opening 75, such that the bayonets 89 and 91 are aligned, respectively, with the recesses 77 and 79. Just prior to assembly, the bayonets 89 and 91 would be disposed just rearwardly of the rearward surface 73 (i.e., to the right in FIG. 2). The bearing retainer 83 is then assembled by moving it forwardly (to the left of FIG. 2) such that the bayonets 89 and 91 pass through the recesses 77 and 79, respectively, until the bearing retainer 83 is in the axial position shown in FIG. 2. Next, the bearing retainer 83 is rotated from the position shown in FIG. 5, to the position shown in FIG. 3, with the bayonets 89 and 91 being disposed within the annular recess 81. As may be seen in FIG. 3, by comparing the rotational orientation of the bayonet 89 to that of the recess 77, it may be seen that the retainer 83 has been rotated about 45°. However, it should be understood that the amount of rotation of the retainer 83 in going from the "insertion" orientation (FIG. 5) to the "installed" orientation (FIG. 3) is not especially critical.

In the subject embodiment, the overall assembly process is as follows. The inner race 63, including the set of bearing members 65 (which would typically be "caged"), is pressed onto the shoulder 61 of the countershaft 27. Next the countershaft 27 is moved forwardly to the position shown in FIG. 2, as was described previously. Finally, the outer race 67 is lightly pressed into the bearing retainer 83, which is then inserted within the opening 75 in the manner described above, until the bearing members 65 are supported within the outer race 67.

Typically, in practicing the bearing retention arrangement of the present invention, it is necessary to provide some sort of "anti-rotation" arrangement to prevent rotation of the bearing retainer 83 relative to the wall portion 35. If the bearing retainer 83 were able to rotate (as a result of vibration, etc.), there would always be the possibility of the retainer 83 moving from its "installed" rotational orientation of FIG. 3 to the "insertion" orientation of FIG. 5, after which it would be possible for the retainer 83 to slide rearwardly, out of the opening 75. This would obviously result in separation of the bearing members 65 from the outer race, and loss of bearing support for the rearward end of the countershaft 27.

Therefore, it is considered technically essential to have an anti-rotation device. Such a device could take many forms, such as an anti-rotation pin, which could be a roll pin or could be in threaded engagement with the wall portion 35. However, in the subject embodiment, such additional structure is unnecessary.

Figure 3:
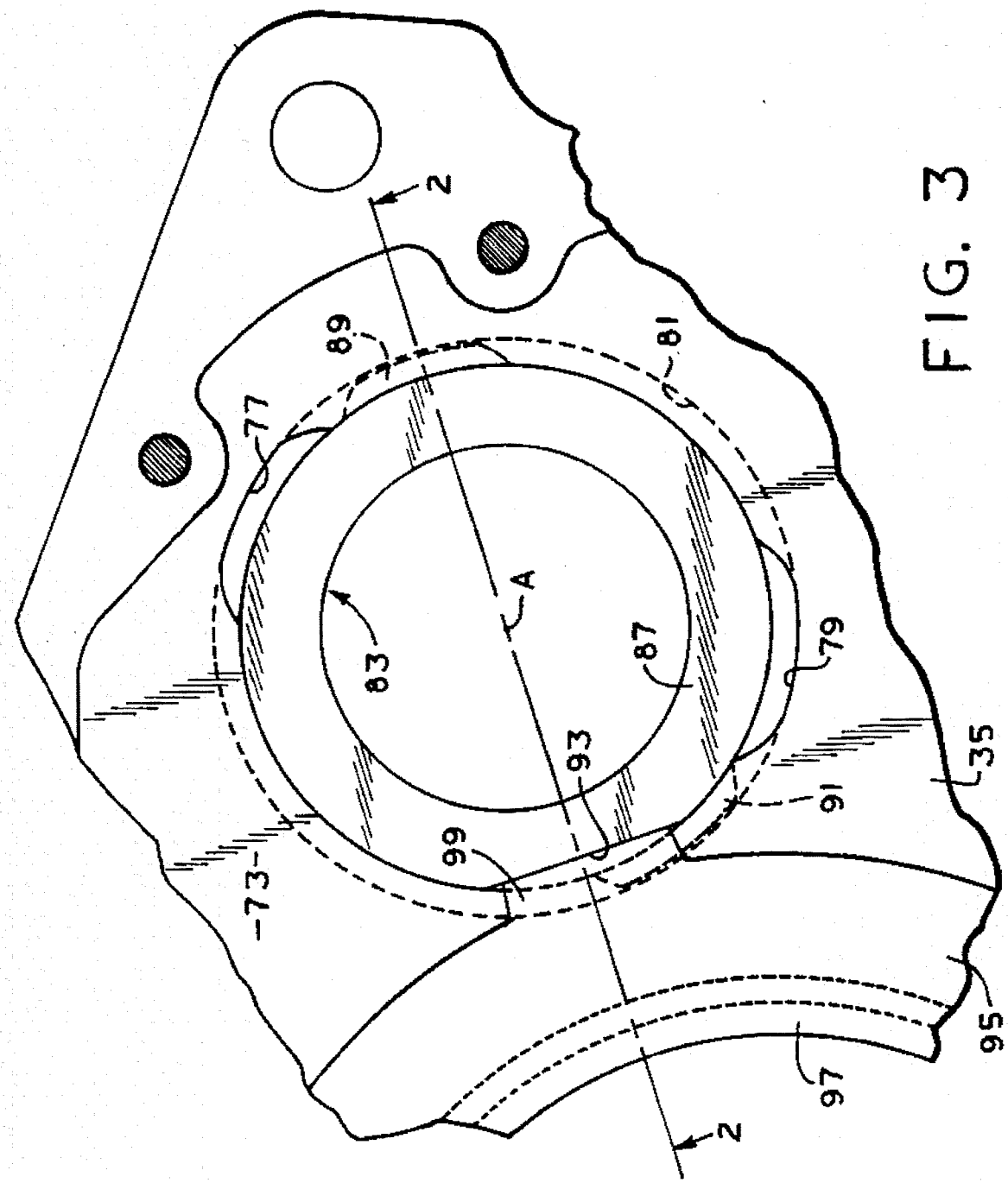
FIG. 3 is a fragmentary transverse plan view, looking from the right in FIG. 2, and on the same scale as FIG. 2.

Referring again just to FIGS. 2 and 3, it has been conventional practice to retain the ball bearing set 59 which surrounds the main shaft 31, and to do so by means of an annular bearing retainer plate 95. The retainer plate 95 includes a radially inward lip or extension 97 which engages and restrains the outer race of the bearing set 59 against movement rearwardly as viewed in FIG. 2. Therefore, in the subject embodiment, the bearing retainer plate 95 is provided with a radially extending tab 99, having a flat or straight outer edge, which engages the flat 93 defined by the bearing retainer 83, as may best be seen in FIG. 3. Therefore, after the countershaft 27 is installed in the position shown in FIG. 2, and the bearing retainer 83 is assembled and in place, the bearing retainer plate 95 is assembled as shown in FIGS. 2 and 3, and attached to the intermediate wall portion 35 by any suitable means, such as a plurality of bolts (not shown in FIGS. 2 and 3). Such bolts would, of course, be required even in the absence of the bearing retainer 83 of the present invention. Therefore, in the subject embodiment, the anti-rotation device for the bearing retainer 83 is essentially "free".

Referring again to FIG. 1, in the transmission shown schematically therein, there is a second countershaft 29 which would also require bearing support of the type shown in FIG. 2, and would also utilize the bearing retainer 83 of the present invention. Therefore, the anti-rotation tab 99 engaging the flat 93 would be duplicated in the bearing retention arrangement for the countershaft 29.

Although the bearing retention arrangement of the present invention has been described in connection with a compound change gear transmission, and more specifically, in connection with the countershafts of the main transmission section, those skilled in the art will understand that the potential application of the present invention is much broader. In any application in which a shaft (or a functionally equivalent element) is to be rotatably supported and mounted relative to a wall or a casing or housing having a coefficient of thermal expansion which is substantially different from that of the bearing outer race, the bearing retainer of the present invention may be utilized advantageously. The bearing retainer of the present invention may also be used advantageously in any application where there would otherwise be concern about pressing the bearing outer race directly into the opening defined by the housing.

The bearing retention arrangement of the present invention also provides a benefit whereby the bearing retainer 83 may be inserted from the rearward side of the wall portion 35 for an application in Which axial bearing loads are applied in a rearward direction (i.e., from the left in FIG. 2), wherein the bearing retainer 83 includes a transverse surface which transmits the bearing load to the wall portion 35. As may best been seen in FIG. 2, a rearward load applied to the countershaft 27 is transmitted through the bearing inner race 63, then through the bearing members 65 to the bearing outer race 67, exerting a rearward (to the right in FIG. 2) force on the radially inwardly extending portion 87, and therefore on the entire bearing retainer 83. Such a rearward load is taken up by the wall portion 35 by means of the face-to-face engagement of the bayonets 89 and 91 within the annular recess 81.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

We claim:

1. A bearing retention arrangement for use in rotatably mounting a shaft relative to a housing defining a bearing opening; said shaft including a mounted portion adapted to be received within said bearing opening; a bearing set disposed radially between said mounted portion of said shaft and said bearing opening, and a generally cylindrical sleeve member being disposed radially between said bearing set and said bearing opening, and defining a leading end; said bearing retention arrangement being characterized by:

(a) said leading end of said sleeve member including at least one retaining portion extending radially beyond a cylindrical outer surface of said sleeve member, whereby said leading end of said sleeve member defines an overall profile which is noncircular;

(b) said bearing opening of said housing being configured, over substantially the entire axial length thereof, to correspond approximately to said overall profile of said leading end of said sleeve member to permit insertion of said member, while in a first rotational orientation (FIG. 5), into said bearing opening, with said leading end moving axially in a first direction through said bearing opening to an axial position (FIG. 2) in which said retaining portion is disposed axially forward of said bearing opening, and whereby, after rotation of said sleeve member about an axis of rotation A of said shaft, to a second rotational orientation (FIG. 3), said retaining portion is disposed in engagement with a forward surface of said housing to prevent substantial axial movement of said sleeve member in a second direction, opposite said first direction; and (c) means operable to maintain said retaining portion of said sleeve member in said second rotational orientation (FIG. 3), in response to radial and axial loads being applied to said shaft.

2. A bearing retention arrangement as claimed in claim 1, characterized by said sleeve member including first and second retaining portions, said portions being generally diametrically oppositely disposed about said axis of rotation A.

3. A bearing retention arrangement as claimed in claim 1, characterized by said bearing set comprising an inner race, an outer race, and a plurality of bearing members disposed radially between, and in rolling engagement with said inner and outer races.

4. A bearing retention arrangement as claimed in claim 3, characterized by said sleeve member includes a trailing end including a radially-inwardly extending flange portion operable to prevent axial movement of said outer race of said bearing set in said second direction, relative to said sleeve member.

5. A bearing retention arrangement as claimed in claim 1, characterized by said shaft comprises a countershaft of a main transmission section of a change gear transmission, said countershaft including a plurality of countershaft gears mounted for rotation with said countershaft, and in meshing engagement with mating gears disposed for rotation with a mainshaft.

6. A bearing retention arrangement for use in rotatably mounting a shaft relative to a housing defining a bearing opening; said shaft including a mounted portion adapted to be received within said bearing opening; a bearing set disposed radially between said mounted portion of said shaft and said bearing opening, and a generally cylindrical sleeve member being disposed radially between said bearing set and said bearing opening and defining a leading end; said bearing retention arrangement being characterized by:

(a) said leading end of said sleeve member including at least one retaining portion extending radially beyond a cylindrical outer surface of said sleeve member;

(b) said bearing opening of said housing defining a recess configured, over substantially the entire axial length thereof, to correspond approximately to said retaining portion, to permit insertion of said member, while in a first rotational orientation (FIG. 5), into said bearing opening, with said retaining portion passing axially in a first direction through said recess to an axial position (FIG. 2) in which said retaining portion is axially forward of said bearing opening, and whereby, after rotation of said sleeve member about an axis of rotation A of said shaft, to a second rotational orientation (FIG. 3), said retaining portion is disposed in engagement with a forward surface of said housing, rotationally adjacent a forward end of said recess, to prevent substantial axial movement of said sleeve member in a second direction, opposite said first direction; and (c) means operable to maintain said retaining portion of said sleeve member in said second rotational orientation (FIG. 3), in response to radial and axial loads being applied to said shaft.

7. A bearing retention arrangement as claimed in claim 6, characterized by said sleeve member including first and second retaining portions, said portions being generally diametrically oppositely disposed about said axis of rotation A.

8. A bearing retention arrangement as claimed in claim 6, characterized by said bearing set comprising an inner race, an outer race, and a plurality of bearing members disposed radially between, and in rolling engagement with said inner and outer races.

9. A bearing retention arrangement as claimed in claim 8, characterized by said sleeve member includes a trailing end including a radially-inwardly extending flange portion operable to prevent axial movement of said outer race of said bearing set in said second direction, relative to said sleeve member.

10. A bearing retention arrangement as claimed in claim 6, characterized by said shaft comprises a countershaft of a main transmission section of a change gear transmission, said countershaft including a plurality of countershaft gears mounted for rotation with said countershaft, and in meshing engagement with mating gears disposed for rotation with a mainshaft.

11. A method of assembling and rotatably supporting a shaft within a housing having a first wall portion and a second wall portion defining a bearing opening; said method comprising the steps of:

(a) pressing a bearing inner race and a set of bearing members onto a rearward mounted portion of said shaft;

(b) passing said shaft forwardly through said bearing opening, toward said first wall portion until said rearward mounted portion is disposed within said bearing opening;

(c) providing a generally cylindrical bearing retainer including a plurality of retaining portions extending radially beyond a cylindrical outer surface of said retainer at a leading end thereof;

(d) forming said bearing opening with recesses to correspond approximately to said bearing retainer and said retaining portions over the entire axial length of said opening;

(e) pressing a bearing outer race into said bearing retainer;

(f) passing said assembly of said outer race and said bearing retainer through said bearing opening, said retaining portions passing axially through said recesses until said retaining portions are disposed adjacent a forward surface of said second wall portion and said bearing outer race engages said bearing members;

(g) rotating said bearing retainer until said retaining portions are no longer rotationally aligned with said recesses.

12. A method as claimed in claim 11 characterized by the further step, after step (g), of providing a member operably associated with said bearing retainer and with said second wall portion, to prevent substantial rotation of said bearing retainer from the position achieved in step (g).

* * * * *